United States Patent [19]
Danforth et al.

[11] Patent Number: 5,870,587
[45] Date of Patent: Feb. 9, 1999

[54] INFORMATION-HANDLING SYSTEM, METHOD, AND ARTICLE OF MANUFACTURE INCLUDING A MECHANISM FOR PROVIDING AN IMPROVED APPLICATION BINARY INTERFACE

[75] Inventors: Scott Harrison Danforth, Austin; Prakash Vinodrai Desai, Round Rock, both of Tex.

[73] Assignee: International Business Machines Corporation, Armonk, N.Y.

[21] Appl. No.: 619,061

[22] Filed: Mar. 20, 1996

[51] Int. Cl.$^6$ .................................................... G06F 9/30
[52] U.S. Cl. ........................ 395/500; 395/682; 395/701; 395/702
[58] Field of Search ................................. 395/500, 800, 395/651, 676, 701, 566, 702, 286, 682, 683; 364/DIG. 1

[56] References Cited

U.S. PATENT DOCUMENTS

| | | | |
|---|---|---|---|
| 4,667,290 | 5/1987 | Goss et al. | 395/707 |
| 4,956,809 | 9/1990 | George et al. | 707/101 |
| 5,077,657 | 12/1991 | Cooper et al. | 395/500 |
| 5,388,264 | 2/1995 | Tobias, II et al. | 395/650 |
| 5,392,390 | 2/1995 | Crozier | 395/161 |
| 5,392,448 | 2/1995 | Frankel et al. | 395/800 |
| 5,446,902 | 8/1995 | Islam | 395/700 |
| 5,493,680 | 2/1996 | Danforth | 395/700 |
| 5,511,002 | 4/1996 | Milne et al. | 364/514 R |
| 5,544,297 | 8/1996 | Milne et al. | 395/154 |
| 5,568,639 | 10/1996 | Wilcox et al. | 395/600 |
| 5,627,972 | 5/1997 | Shear | 395/200.18 |
| 5,655,154 | 8/1997 | Jain et al. | 395/890 |
| 5,675,782 | 10/1997 | Montague et al. | 395/609 |
| 5,675,803 | 10/1997 | Preisler et al. | 395/704 |

Primary Examiner—Kevin J. Teska
Assistant Examiner—Thai Phan
Attorney, Agent, or Firm—David A. Mims; Andrew J. Dillon

[57] ABSTRACT

An information-handling system is disclosed that includes an improved application programmatic interface that allows application binary interfaces to be ported from one platform to another incompatible platform with minimal difficulty. Within the information-handling system, there are one or more processors; a storage system; one or more I/O controllers; a system bus connecting the processors, the storage system, and the I/O controller; and an operating system programmed for controlling the operation of the information-handling system. The application programmatic interface (API) operates in association with the operating program. The API provides a language and platform neutral interface for manipulating a particular variable list within the ABI and is portable from one platform to another.

18 Claims, 5 Drawing Sheets

INFORMATION-HANDLING SYSTEM, METHOD, AND ARTICLE OF MANUFACTURE INCLUDING A MECHANISM FOR PROVIDING AN IMPROVED APPLICATION BINARY INTERFACE

BACKGROUND OF THE INVENTION

1. Technical Field

The present invention relates generally to information processing systems supporting multiple platforms. More specifically, the present invention relates to an application programmatic interface that provides language and platform neutral interfacing among platforms operating in a processing system.

2. Description of the Related Art

Electronic computing systems pervade nearly every aspect of business and personal life. Computer systems are used in businesses for managing large amounts of data and processing such data. In this need to process data, several platforms have been provided for operation on various computer systems. These platforms typically are proprietary and have difficulty talking one with another for software conversion. This is important in that particular software programs that find strong popularity on one platform migrate to another platform, but the incompatibility of the platform's language prevent ease of transporting such popular software to the new platform.

Each platform has a unique application binary interface (ABI) that determines how variable arguments are stored in memory. In the C language, within the C library, there is provided an interface that creates a variable argument list on the stack frame of a function that expects to receive a variable number of arguments as input. Unfortunately, a software developer needing to create a variable argument list would then need to know the details about linkage conventions and the way variable arguments are represented for a given platform. If the different platforms have dissimilar ABIs, the task of writing portable code for multiple platforms becomes nearly impossible.

Accordingly, what is needed is an API that allows applications to be ported across multiple platforms without great difficulty.

SUMMARY OF THE INVENTION

The above as well as additional objectives, features, and advantages of the present invention will become apparent in the following detailed written description.

According to the present invention, an information-handling system is disclosed that includes an improved application programmatic interface that allows application binary interfaces to be ported from one platform to another incompatible platform with minimal difficulty. Within the information-handling system, there are one or more processors; a storage system; one or more I/O controllers; a system bus connecting the processors, the storage system, and the I/O controller; and an operating system programmed for controlling the operation of the information-handling system. The application programmatic interface (API) operates in association with the operating program. The API provides a language and platform neutral interface for manipulating a particular variable list within the ABI and is portable from one platform to another.

The application programmatic interface further includes a means for creating and initializing selected object variable buffer structures. The object variable buffer structures may contain user variable arguments. Further, the API includes means for adding an argument passed to a variable list contained within one of the object variable buffer structures. Means for copying a variable list in the object variable buffer structure to the variable list passed in as an input argument is also included in the API. Additionally, the API includes means for clearing any allocated memory associated with the object variable buffer structure and the variable list contained within the object variable buffer structure. Further, the API includes means for retrieving a first scalar value stored in an initialized variable list within the object variable buffer structure. And, the API further includes means for allowing a user to place a first argument in the initialized variable list stored within the object variable buffer structure. The API is disclosed to be implemented as either a program loaded within the information-handling system or stored on a computer-usable medium or implemented as a method for porting the programs from a particular platform to a second, incompatible platform.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
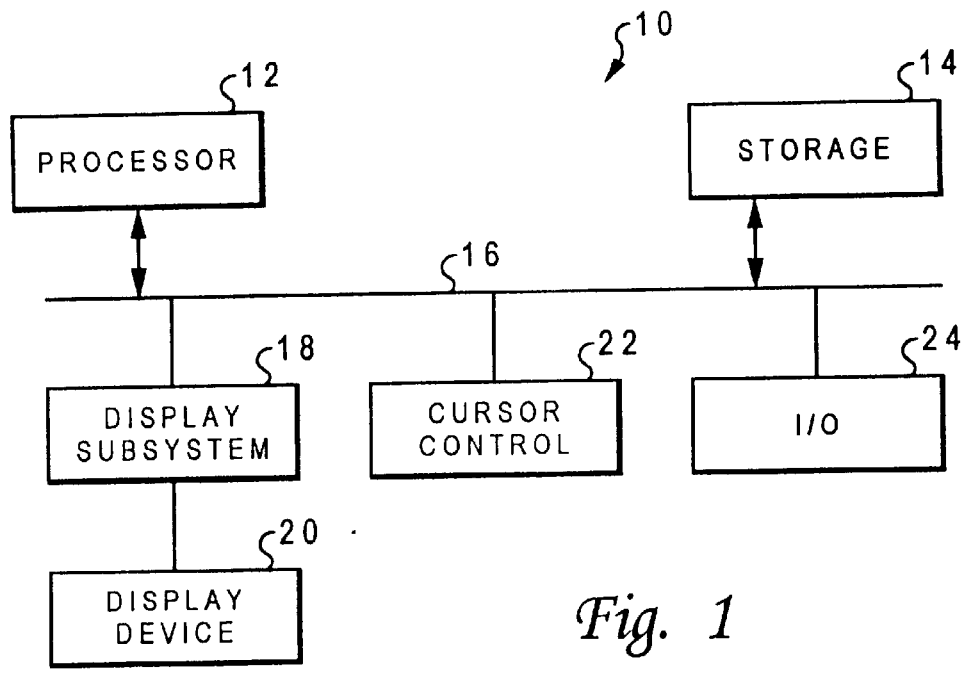
FIG. 1 is a block diagram of a system for executing the method according to the present invention.
Figure 2:
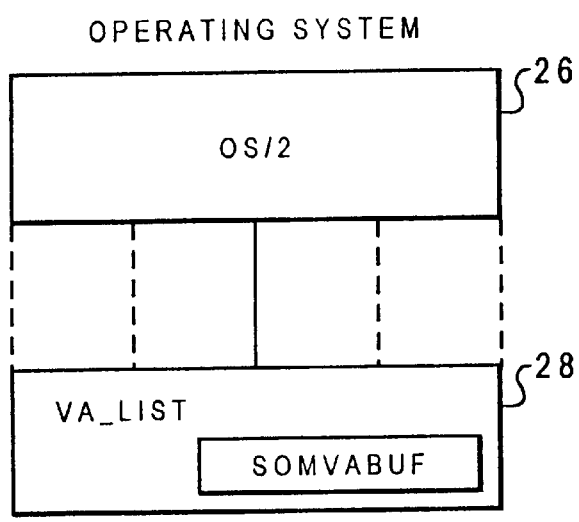
FIG. 2 is a block diagram showing the operating system platform and system object model programs supporting the present invention.

Referring now to FIGS. 1 and 2, on an information-handling system 10 and an operating system environment for the present invention are now described.

An information-handling system 10 may be a graphics workstation or the like with a powerful processor 12, a storage system 14, a system bus 16, display subsystem 18 controlling a display device 20, a cursor control device 22, and an I/O controller 24, all connected by system bus 16. The information-handling system 10, shown in FIG. 1 may be operated by a commercially available, well-known multitasking operating system 26 (shown in FIG. 2) such as OS/2 (OS/2 is a registered trademark of International Business Machines Corporation). Among many tasks that the OS/2 operating system controls, upon operating information-handling system 110, is the execution of programs using SOM objects contained in SOMObjects, which is part of a commercially available product of International Business Machines Corporation.

The method and article of manufacture of the present invention may be incorporated in the SOMobjects program, block 28 of FIG. 2.

As has been previously stated, Application Binary Interfaces (ABI) for a given platform are proprietary in nature and do not provide ease of portability to multiple platforms. To address this particular problem, the present invention provides a new application programmatic interface (API) that provides a language and platform neutral interface for manipulating a variable list (va_list). The improved API provides at least six functions packaged in a library. These functions hide all the low-level details of the ABI from the users of variable argument lists, allowing them to write highly portable code.

The ABI dependencies are "hidden" from the users in the SOMvariable buffer (somVaBuf) data structure. The new functions manipulate the va_list contained in the somVaBuf structure. These functions include being able to create an somVaBuf that contains a platform specific va_list; add arguments to the va_list in the somVaBuf structure; extract the va_list from the somVaBuf structure and use it as if the C library function had created it; destroy the somVaBuf and the contained va_list; and, examine and modify the first argument in the va_list after it has been considered. For each new va_list representation, the API adds a library that provides support for the above functions. The advantage to this is that the user programs do not change and therefore are highly portable.

The new functions are:
1. Create a somVABuf:
   void*somVaBuf_create(char*vb, int size)
   Input:
      vb Pointer to user allocated memory or NULL
      int Size of user memory or NULL
   Output:
      somVaBuf or a NULL This function creates and initializes the somVaBuf structure.

This structure may contain the users variable arguments.

2. Add an argument to the va_list:
   long somVaBuf_add(spmVaBuf vb, char*arg, int type)
   Input:
      vb somVaBuf—result of somVaBuf_create
      arg Pointer to argument to be added to the va_list
      type Argument type (TCKind)
   Output:
      Success 0
      Failure 1

This function adds the passed in argument to the va_list contained in the somVaBuf structure.

3. Initialize a va_list from the somVaBuf:
   void somVaBuf_get_valist(somVaBuf, va_list*ap)
   Input:
      vb Pointer to a somVaBuf structure
      ap Pointer to a va_list
   Output:
      None This function copies the va_list in the somVaBuf structure to the va_list passed in as an input argument.

4. somVaBuf cleanup
   void somVaBuf_destroy(somVaBuf vb)
   Input:
      vb Pointer to a somVaBuf data structure
   Output:
      None.

This function frees the allocated memory associated with the somVaBuf structure and the va_list contained in the somVaBuf structure.

5. Fetch the first argument in an initialized va_list
   unsigned long somvalistGetTarget(va_list ap)
   Input:
      ap an initialized va_list
   Output:
      First scalar value on the va_list.

This function allows users to examine the first scalar value in an initialized va_list.

6. Modify the first argument in an initialized va_list
   void somvalistSetTarget(va_list ap, unsigned long val)
   Input:
      ap an initialized va_list
      val value to replace the first scalar value in the va_list.
   Output:
      None This function allows users to replace the first argument in an already initialized va_list.

Figure 3:
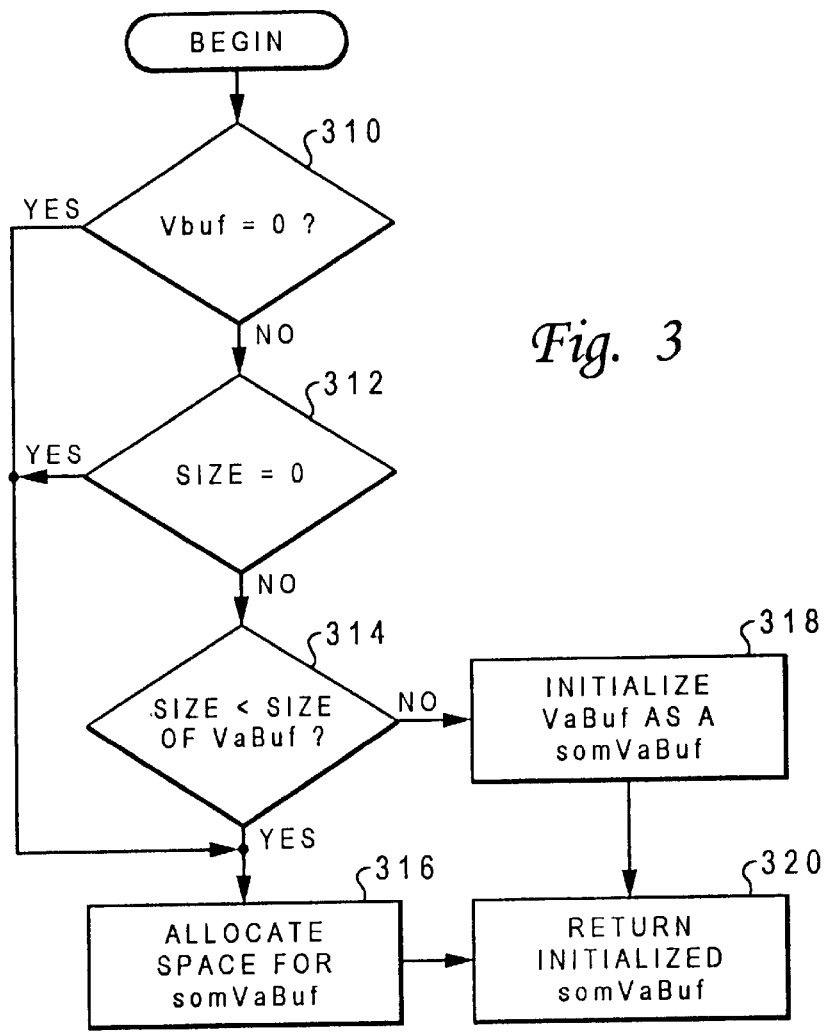
FIG. 3 is a block diagram depicting the implementation of the code for invoking a somVaBuf mechanism.

FIG. 3 is a block diagram depicting the implementation of the code for invoking a somVaBuf mechanism, which contains a platform specific va_list. Void*somVaBuf_create (char*vbuf,int size). Initially, in block 310, the mechanism determines whether the input argument, vbuf is zero. If not, it proceeds to block 312. Otherwise, the mechanism proceeds to block 316, where the mechanism allocates space for the somVaBuf. In block 312, the system determines whether the input argument size is zero, and if not, proceeds to block 314. Otherwise, if the size is zero, the system proceeds to block 316. In block 314, the system determines whether the size is less than the size of the VaBuf, and if so, proceeds to block 316; otherwise, the system proceeds to block 318. In block 318, the system initializes the VaBuf as a somVaBuf and then proceeds to block 320, where the system returns the initialized somVaBuf for processing. Likewise, after block 316, the system proceeds to block 320.

Figure 4A:
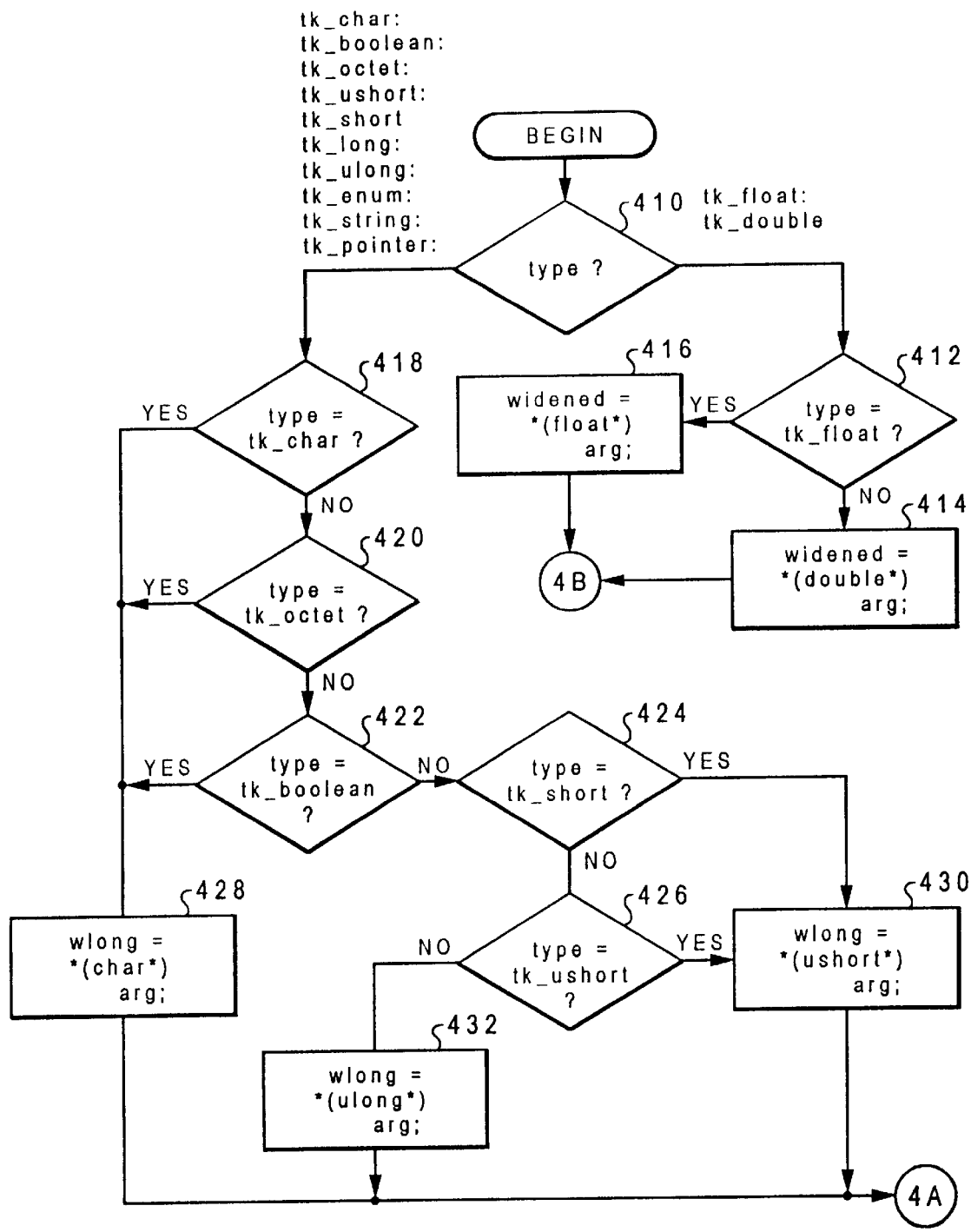
FIGS. 4A and 4B are flow diagrams depicting the function of adding arguments to the va_list in the somVaBuf structure.
Figure 4B:
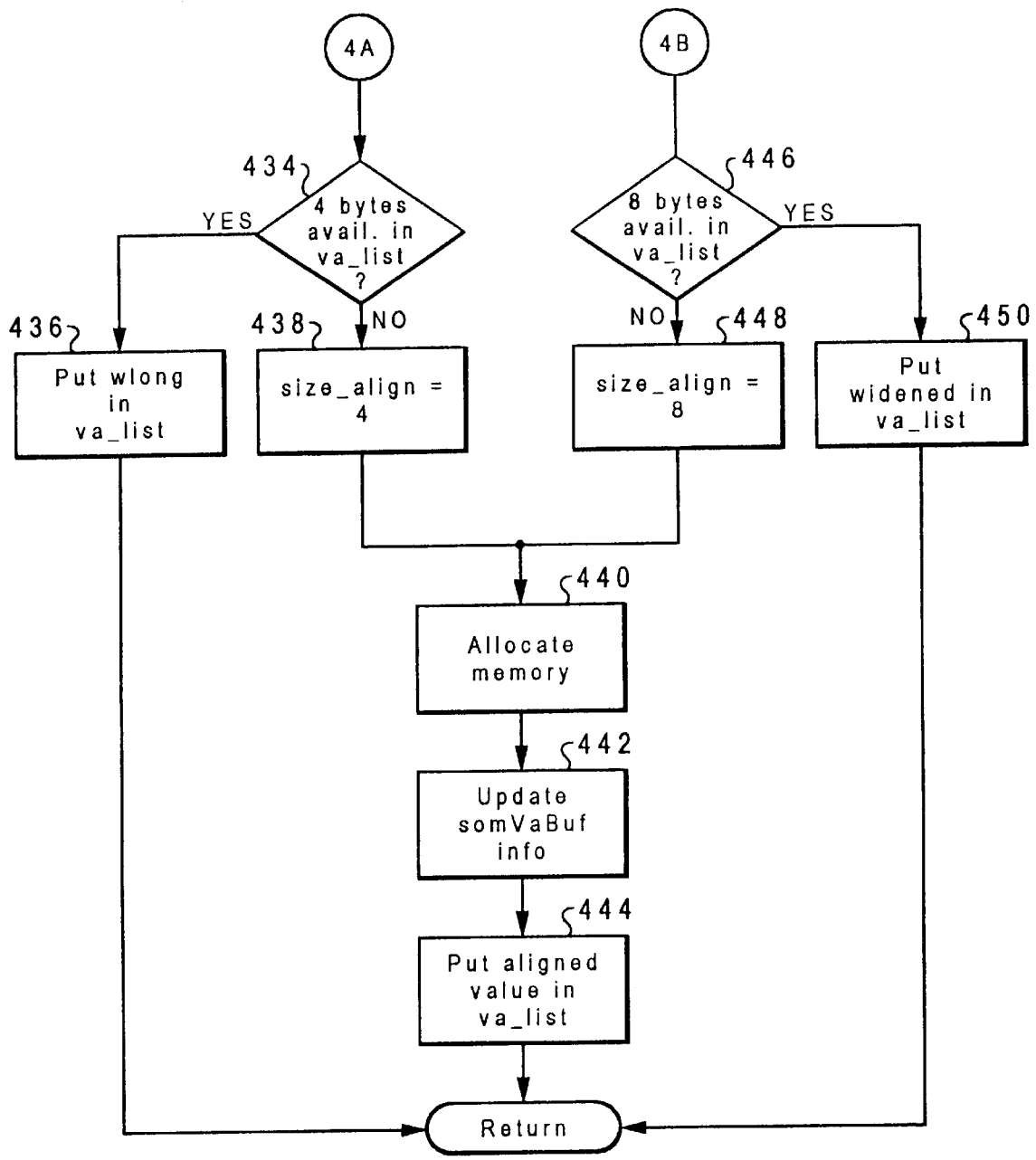

Referring now to FIGS. 4A and 4B, the function of adding arguments to the va_list in the somVaBuf structure is depicted in the block diagram of FIG. 4. This has the argument in C language of long somVaBuff_add (void*vbuf,char*arg,int type). Initially, in block 410, the system determines the type of the argument to be added to the va_list in somVaBuf. For the argument for float and double, which is floating point operation or double precision operation, the system branches to the right in FIG. 4; otherwise, for the remaining arguments of character, boolean, octet, ushort, short, long, ulong, enumerator, string, or pointer are some branches to the left. We will now proceed on the right with respect to the float and double precision arguments. First, in block 412, the system determines whether the argument type is floating point and if so, proceeds to block 414, where it defines the width as being a doublewide argument. If not, the system proceeds to set the width as being a floating point argument. In either case, upon completion, the system proceeds to the B branch that continues on the second figure attachment of FIG. 4B.

If the type is any of the other previously mentioned types that does not include the float or double precision type, the system proceeds to block 418–422 to determine whether the type is either the character, octet, boolean, short, or u-short argument respectively. If, in block 418–422, the mechanism determines that the type is either the character, octet, or boolean argument, the system proceeds to block 428. To avoid doing updates after each check, the mechanism initializes a local variable, wlong, with a pointer to the users argument after each check. When all checks are completed, the va__list can be updated, block 436. If the type is neither short nor u-short, the system proceeds to block 432 where the argument is established as u-long. At this point, the system then proceeds to point A in FIG. 4B.

Along the A branch, the mechanism proceeds to block 434, where the mechanism determines if four bytes are available in the Va__list and, if so, proceeds to block 436; otherwise, the system proceeds to block 438. In block 436, the mechanism places the user's argument pointed at by wlong in the va__list and then returns to the main program. In block 438, the system sets the size alignment equal to four bytes and then proceeds to blocks 440–444 before returning. In block 440, the mechanism allocates adequate memory for the va__list. In block 442, the mechanism updates the somVaBuf information file. In block 444, the mechanism puts the aligned value within the va__list before returning.

Along the B branch, in block 446, the mechanism determines whether 8 bytes are available within the va__list. If not, the system proceeds to block 448; otherwise, the mechanism proceeds to block 450. In block 448, the mechanism establishes the size alignment to eight bytes wide, following which, the mechanism proceeds to blocks 440–444, which have been previously described above. In block 450, the mechanism places the widened arguments within the va__list and then returns.

Figure 5:
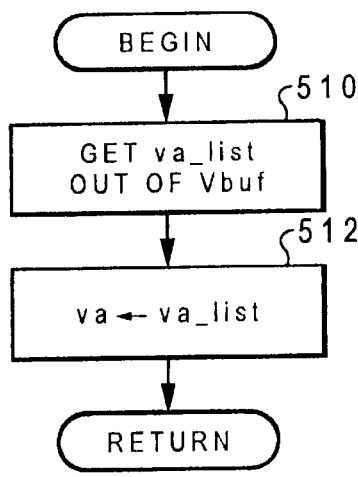
FIG. 5 is a block diagram depicting the flow of the function that extracts the va_list structure from the somVaBuf structure.

FIG. 5 is a block diagram depicting the flow of the function that extracts the va__list structure from the somVaBuf structure. This is implemented in the C language as void somVaBuf__valist(void*vbuf,va__list*va). In block 510, the mechanism retrieves the va__list from the somVaBuf.

Figure 6:
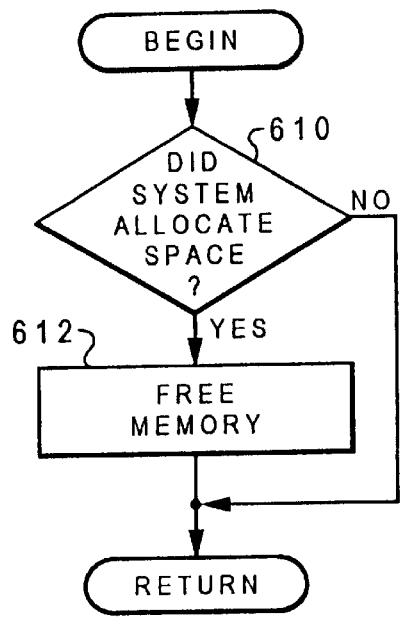
FIG. 6 is a flow diagram depicting the implementation of the function that destroys the somVaBuf structure and the contained va_list.
Figure 7:
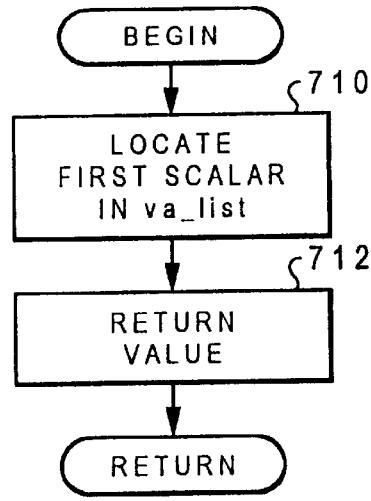
FIG. 7 is a block diagram of the function that examines the first argument in a va_list after it has been constructed.

Next, FIG. 6 is a flow diagram depicting the implementation of the function that destroys the somVaBuf structure and the contained va__list. This is implemented in C code as somVaBuf__destroy(void*vbuf). First, in block 610, the mechanism determines if it had allocated space for the somVaBuf; otherwise it returns. If the mechanism had allocated space, the system proceeds to block 612, where the memory is freed. Next, the system returns. FIG. 7 is a block diagram of the function that examines the first argument in a va__list after it has been constructed. This is in C language unsigned long somva__listGetTarget(va__listAP). Initially, in block 710, the mechanism locates the first scalar in the va__list pointed at by the input argument ap. Once the first scalar has been located, this value is returned for further processing.

Figure 8:
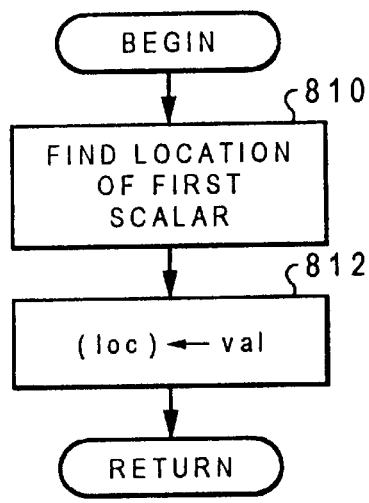
FIG. 8 is a block diagram of the function that modifies the first argument in a va_list after it has been constructed.

FIG. 8 is a block diagram of the function that modifies the first argument in a va__list after it has been constructed. This is implemented in C language as void somvalistSetTarget (va__list ap, unsigned long val). The initial step or block in 810 first determines the location of the first low scalar. Once this location is determined, then the value is placed in that location.

While the invention has been particularly shown and described with reference to a preferred embodiment, it will be understood by those skilled in the art that various changes in form and detail may be made therein without departing from the spirit and scope of the invention.

What is claimed is:

1. An information-handling system, comprising:
   one or more processors;
   a storage system;
   one or more I/O controls;
   a system bus connecting the processors, the storage system, and the I/O controller;
   an operating system programmed for controlling operation of the information-handling system; and
   an application programmatic interface (API) program, operating in association with the operating system program, for providing a language and platform-neutral interface for creating and initializing selected object variable buffer structures which contain a variable list and user variable arguments and for manipulating said variable list as though said variable list were created within said operating system.

2. A system according to claim 1, wherein the API program further comprises:
   means for adding an argument passed to a variable list contained within one of said object variable buffer structures.

3. A system according to claim 2, wherein the API program further comprises:
   means for copying a variable list in said object variable buffer structure to said variable list passed in as an input argument.

4. A system according to claim 2, wherein the API program further comprises:
   means for clearing any allocated memory associated with said object variable buffer structure and said variable list contained within said object variable buffer structure.

5. A system according to claim 2, wherein said API further comprises:
   means for retrieving a first-scalar value stored in an initialized variable list within said object variable buffer structure.

6. A system according to claim 2, wherein said API further comprises:
   means for allowing a user to place a first argument in an initialized variable list stored within said object variable buffer structure.

7. A computer-readable medium, comprising:
   instruction means for providing an operating system for controlling operation of an information-handling system;
   instruction means within said computer-readable medium for providing an application programmatic interface (API) that provides a language and platform neutral interface for creating and initializing selected object variable buffer structures which contain a variable list and user variable arguments and for manipulating said variable list as though said variable list were created within said operating system for porting application binary interfaces from a given platform to one or more additional platforms.

8. A computer-readable medium, according to claim 7, wherein the API means further comprises:
   instruction means within said computer-readable medium for adding an argument passed to a variable list contained within one of said object variable buffer structures.

9. A computer-readable medium, according to claim 7, wherein the API means further comprises:
   instruction means within said computer-readable medium for copying a variable list in said object variable buffer structure to said variable list passed in as an input argument.

10. A computer-readable medium, according to claim 7, wherein the API means further comprises:

instruction means within said computer-readable medium for clearing any allocated memory associated with said object variable buffer structure and said variable list contained within said object variable buffer structure.

11. A computer-readable medium, according to claim 7, wherein said API means further comprises:

instruction means within said computer-readable medium for retrieving a first-scalar value stored in an initialized variable list within said object variable buffer structure.

12. A computer-readable medium, according to claim 7, wherein said API means further comprises:

instruction means within said computer-readable medium for allowing a user to place a first argument in an initialized variable list stored within said object variable buffer structure.

13. A method for porting application binary interfaces (ABIs) from a selected platform to one or more additional platforms operating on an information-processing system, comprising the steps of:

providing an application programmatic interface that provides a language and platform neutral interface for creating and initializing selected object variable structures which contain a variable list and user variable arguments and for manipulating said variable list as though said variable list were created within said selected platform and for porting said ABI from said selected platform to said one or more additional platforms.

14. A method for porting ABIs, according to claim 13, wherein the API means further comprises:

adding an argument passed to a variable list contained within one of said object variable buffer structures.

15. A method for porting ABIs, according to claim 13, wherein the API means further comprises:

copying a variable list in said object variable buffer structure to said variable list passed in as an input argument.

16. A method for porting ABIs, according to claim 13, wherein the API means further comprises:

clearing any allocated memory associated with said object variable buffer structure and said variable list contained within said object variable buffer structure.

17. A method for porting ABIs, according to claim 13, wherein said API means further comprises:

retrieving a first-scalar value stored in an initialized variable list within said object variable buffer structure.

18. A method for porting ABIs, according to claim 13, wherein said API means further comprises:

allowing a user to place a first argument in an initialized variable list stored within said object variable buffer structure.

* * * * *